United States Patent [19]
Sakaki

[11] Patent Number: 6,009,453
[45] Date of Patent: Dec. 28, 1999

[54] MULTI-PROGRAM EXECUTION CONTROLLING APPARATUS AND METHOD

[75] Inventor: Kinya Sakaki, Tokyo, Japan

[73] Assignee: Kabushiki Kaisha Toshiba, Kawasaki, Japan

[21] Appl. No.: 08/622,410

[22] Filed: Mar. 27, 1996

[30] Foreign Application Priority Data

Mar. 29, 1995 [JP] Japan .................................. 7-071847

[51] Int. Cl.$^6$ .................................................. G06F 9/00
[52] U.S. Cl. .............................................. 709/107; 712/1
[58] Field of Search .................................. 395/280, 800; 709/100–108; 712/1

[56] References Cited

U.S. PATENT DOCUMENTS

| | | | |
|---|---|---|---|
| 5,408,672 | 4/1995 | Miyazawa et al. | 395/800 |
| 5,452,431 | 9/1995 | Bournas . | |
| 5,566,303 | 10/1996 | Tashiro et al. | 395/280 |

FOREIGN PATENT DOCUMENTS 0 371 673  6/1990  European Pat. Off. .

OTHER PUBLICATIONS

INTEL, pp. 4.1–15.9, 1990, "386™ DX Microprocessor Programmer's Reference Manual".

*Primary Examiner*—Alvin E. Oberley
*Assistant Examiner*—Pat Caldwell
*Attorney, Agent, or Firm*—Oblon, Spivak, McClelland, Maier & Neustadt, P.C.

[57] ABSTRACT

A storage section stores a plurality of programs. A central processing section controls execution of each of the plurality of programs stored in the storage section. A setting section, in cooperation with the central processing section, sets at least one of a disable area that inhibits accessing of another program and an enable area that allows accessing of another program, in each of the plurality of programs stored in the storage section.

4 Claims, 3 Drawing Sheets

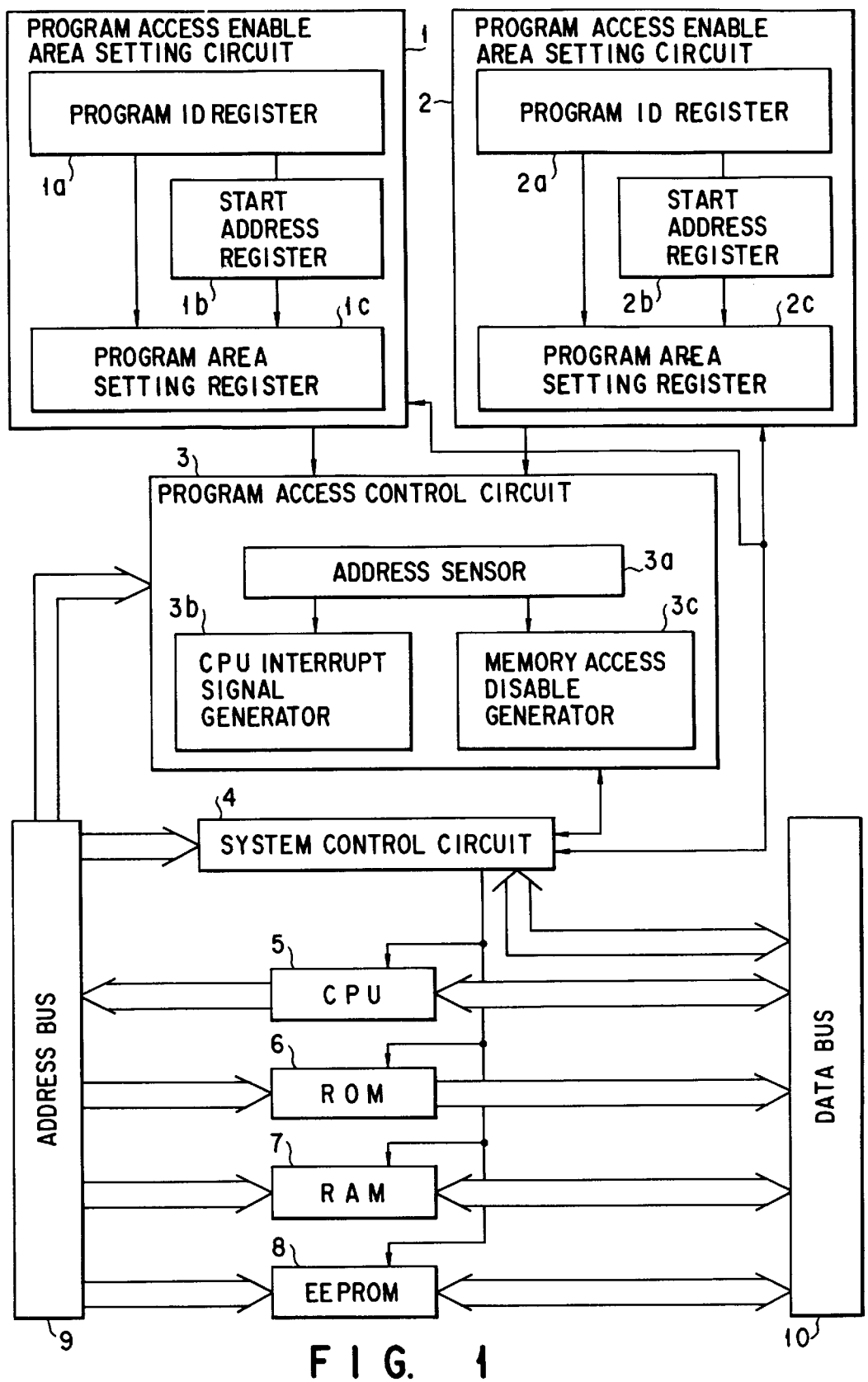
F I G. 1

MULTI-PROGRAM EXECUTION CONTROLLING APPARATUS AND METHOD

BACKGROUND OF THE INVENTION

1. Field of the Invention

The present invention generally relates to a multi-program execution controlling apparatus and method, and more particularly to a multi-program execution controlling apparatus and method which inhibit a program currently being executed from unnecessarily accessing another program in a one-chip microcomputer having a plurality of programs.

2. Description of the Related Art

For portable data carriers, such as IC cards or wireless cards, the security of their programs and data has been considered important.

In one-chip microcomputers used for such portable data carriers, a single main program is allocated to a single semiconductor chip. Even when it has a plurality of programs, these programs are used to act as extension of the main program or part of the main program's function in the form of subroutines.

With program execution controlling techniques for such one-chip microcomputers, the identification (ID) information on the running ones of the plurality of programs are sent to the central processing unit (CPU) in the one-chip microcomputer, which thereby informs which program is now being executed, making it possible to manage the programs there.

Persons qualified to create programs to be installed in such one-chip microcomputers are restricted to those who are familiar with the operating system (OS) of the one-chip microcomputers and manage, own, and sell the one-chip microcomputers, or to those who have been asked to develop and create the programs and know the OS for all the programs.

Here, the OS for a one-chip microcomputer is not the OS for the CPU itself in the one-chip microcomputer, but a chip OS that takes the form of an algorithm of a program corresponding to an application and is used in a system and that defines command usage and data management method in a manner that determines how to access which data at which address in the memories around the CPU.

The instruction organization or OS for the CPU itself has been made public.

With the techniques for controlling the execution of multiple programs on the conventional one-chip microcomputer, the CPU can recognize the program being executed in the case of normal programs that tell their own IDs to the CPU according to the specific rules. When a program does not follow the specific rules, however, this causes the problem that the CPU cannot recognize the program being executed.

Furthermore, with the techniques for controlling the execution of multiple programs on the conventional one-chip microcomputer, it is impossible to inhibit one program being executed from accessing another program, and moreover, there is no need to do that. Consequently, when another invalid program has been written in the memory addresses, there is a possibility that the preceding program is rewritten, read out, or executed, which cannot be avoided technically.

Still furthermore, with the techniques for controlling the execution of multiple programs on the conventional one-chip microcomputer, when persons other than the aforementioned persons are asked to write programs, the chip OS of the one-chip microcomputer must be made known to the programmers. Accordingly, there is a strong possibility that the contents of the system will leak out, which is unfavorable in terms of security and makes it technically impossible to prevent unauthorized use of the contents from being made easily.

SUMMARY OF THE INVENTION

It is, therefore, an object of the present invention to provide a new and improved multi-program execution controlling apparatus and method which control the execution of programs in a one-chip microcomputer having a plurality of programs in a manner that not only inhibits a program from unnecessarily accessing another program in executing programs, but also increases the security of the programs and data.

According to a first aspect of the present invention, there is provided a multi-program execution controlling apparatus comprising: storage means for storing a plurality of programs; central processing means for controlling execution of each of the plurality of programs stored in the storage means; and setting means, in cooperation with the central processing means, for setting at least one of a disable area that inhibits the accessing of another program and an enable area that allows accessing of another program, in each of the plurality of programs stored in the storage means.

According to a second aspect of the present invention, there is provided a multi-program execution controlling apparatus comprising: storage means for storing a plurality of programs; central processing means for controlling execution of each of the plurality of programs stored in the storage means; setting means, in cooperation with the central processing means, for setting a disable area that inhibits accessing of another program in each of the plurality of programs stored in the storage means; and control means, in cooperation with the central processing means, for at least one of interrupting to the central processing means and inhibiting access to the storage means, when an attempt is made to access the disable area of another program while one of the plurality of programs stored in the storage means is being executed.

According to a third aspect of the present invention, there is provided a multi-program execution controlling apparatus comprising: storage means for storing a plurality of programs; central processing means for controlling execution of each of the plurality of programs stored in the storage means; program ID identifying means, in cooperation with the central processing means, for identifying an ID of a program to be executed of the plurality of programs stored in the storage means; program area setting means, in cooperation with the central processing means, for setting an area that allows accessing of a program to be executed of the plurality of programs stored in the storage means; start address setting means, in cooperation with the central processing means, for setting an address at which operation will start when operation is switched to a program to be executed; address sensing means for comparing the address set at the program area setting means with an address being accessed by the program currently being executed to sense whether it is an enable address or a disable address; interrupt signal generator means for, when a sensing result of the address sensing means shows that it is a disable address, generating a signal to interrupt to the central processing means on the basis of the sensing result; and memory access disable signal generator means for, only when a sensing result of the address sensing means shows that access is intended for a disable address, generating a signal to inhibit access to the storage means corresponding to the disable address.

According to a fourth aspect of the present invention, there is provided a multi-program execution controlling method comprising the steps of: identifying, in cooperation with a central processing means, an ID of a program to be executed of a plurality of programs stored in a storage means; setting, in cooperation with the central processing means, an area that allows accessing of a program to be executed of the plurality of programs stored in the storage means; setting, in cooperation with the central processing means, an address at which operation will start when operation is switched to a program to be executed; comparing the address set at the setting step with an address being accessed by the program currently being executed to sense whether it is an enable address or a disable address; generating a signal to interrupt to the central processing means, when a sensing result at the sensing step shows that the access is indented for a disable address, on the basis of the sensing result; and generating a signal to inhibit access to the storage means corresponding to the disable address, only when a sensing result at the sensing step shows that access is intended for a disable address.

With the multi-program execution controlling apparatus according to the first aspect of the present invention, the setting means sets at least one of a disable area that inhibits each program from being accessed by another program and an enable area that allows each program to be accessed by another program.

With the multi-program execution controlling apparatus according to the second aspect of the present invention, the setting means sets a disable area that inhibits each program from being accessed by another program, the control means at least one of interrupts to the central processing unit and inhibits access to the storage means, when a program currently being executed of the plurality of programs attempts to access the disable area of another program.

With the multi-program execution controlling apparatus according to the third aspect of the present invention, in the program access enable area setting means, the program ID identifying means identifies the ID of a program to be executed of the plurality of programs, the program area setting means sets an area that allows the program to access, and the start address setting means sets an address at which operation will start when control is switched to the program.

Then, in the program access control means, the address sensing means compares the address set at the program area setting means with the address being accessed by the program currently being executed to sense whether it is an enable address or a disable address, the interrupt signal generator means, when the sensing result from the address sensing means shows that it is a disable address, generates a signal to interrupt the central processing unit on the basis of the sense signal, and the memory access disable signal generator means, only when the sensing result from the address sensing means shows that the access is intended for a disable address, generates a signal to inhibit access to the storage means corresponding to the disable address.

With the multi-program execution controlling method according to the fourth aspect of the present invention, the ID of a program to be executed of the plurality of programs is identified, an area that allows the accessing of the program is set, an address at which operation will start when control is switched to the program is set, the set address is compared with the address being accessed by the program currently being executed to sense whether the address is an enable address or a disable address, and when the sensing result shows that it is a disable address, a signal to interrupt the control processing means is generated on the basis of the sense signal, and only when the sensing result shows the access is intended for a disable address, a signal to inhibit access to the storage means corresponding to the disable address is generated.

Additional object and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of the main part of a one-chip microcomputer having a plurality of programs to which a multi-program execution controlling apparatus according to an embodiment of the present invention is applied;

DETAILED DESCRIPTION OF THE PREFERRED EMBODIMENTS

Figure 2:
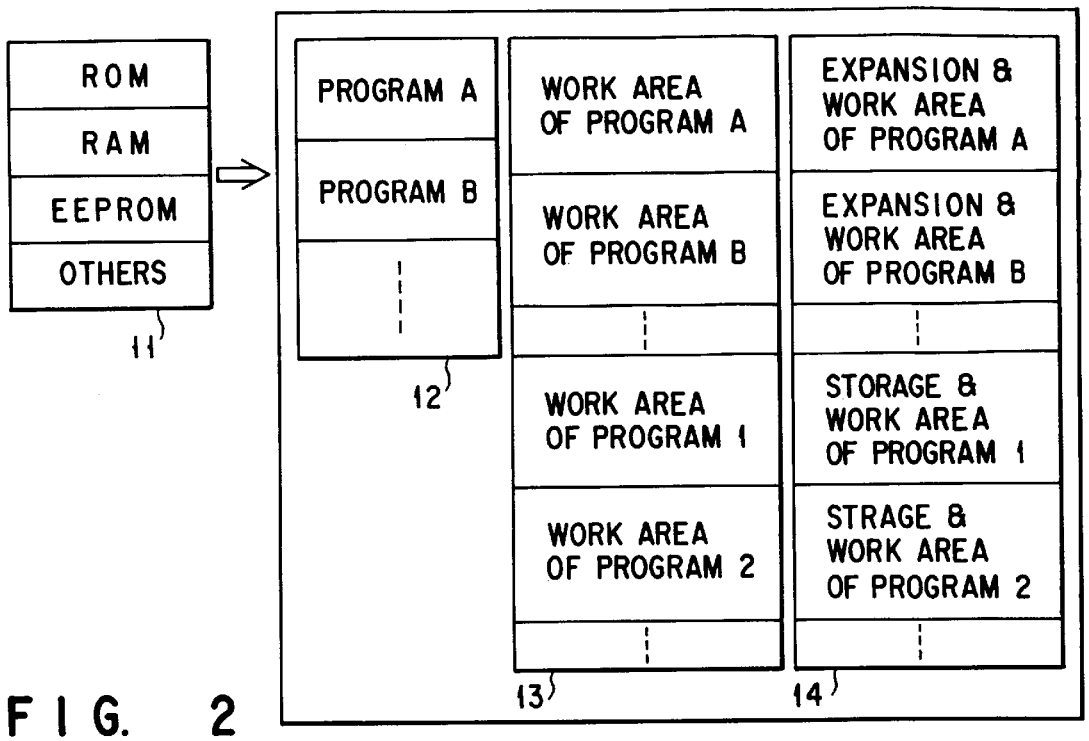
FIG. 2 is a memory map to help explain access to memory in the multi-program execution controlling apparatus of the present invention.

Reference will now be made in detail to the presently preferred embodiment of the invention as illustrated in the accompanying drawings, in which like reference characters designate like or corresponding parts throughout the several drawings.

Hereinafter, an embodiment of the present invention will be described.

FIG. 1 is a block diagram of the main part of a one-chip microcomputer having a plurality of programs to which a multi-program execution controlling apparatus according to an embodiment of the present invention is applied.

As shown in FIG. 1, the outputs of a first and second program access enable area setting circuits 1 and 2 are connected to the inputs of a program access control circuit 3. The output of the program access control circuit 3 is connected to the input of a system control circuit 4.

The output of the system control circuit 4 is connected to the input of each of a central processing unit (CPU) 5, a read-only memory (ROM) 6, a random access memory (RAM) 7, a nonvolatile memory, such as an electrically erasable programmable ROM (EEPROM) 8.

The system control circuit 4 is also connected bilaterally to each of the first and second program access enable area setting circuits 1, 2.

The output of the CPU 5 is connected to an address bus 9. The address bus 9 is connected to the input of each of the ROM 6, RAM 7, EEPROM 8, system control circuit 4, and the program access control circuit 3.

The output of the ROM 6 is connected to a data bus 10. The data bus 10 is connected to each of the system controller 4, CPU 5, RAM 7, and EEPROM 8.

As describe above, the multi-program execution controlling apparatus of the embodiment is provided with the first and second program access enable area setting circuits 1, 2 and the program access control circuit 3 in order to sense the accessing state of each program in the one-chip microcomputer having a plurality of programs and prevent a program from unnecessarily accessing another program.

The first program access enable area setting circuit 1 specifically comprises a program ID identifying register 1a, a program area setting register 1c, and a start address register 1b.

In the program ID identifying register 1a, an ID indicating which program is to be executed is set.

The program area setting register 1c is a register in which an address of an area that allows the accessing of the program is set.

The start address register 1b is a register in which an address at which the program will start when control is passed to the program, is set.

The configuration of each register holds true for the second program access enable area setting circuit 2, which thus comprises a program ID identifying register 2a, a program area setting register 2c, and a start address register 2b.

The program access control circuit 3 comprises an address sensor 3a, a CPU interrupt signal generator 3b, and a memory access disable signal generator 3c.

The address sensor 3a senses whether the address is an enable address or a disable address by checking the address set in the program area setting register 1c or 2c in the first or second program access enable area setting circuits 1, 2 and the address being accessed by the currently running program.

When the sensing result of the address sensor 3a is a disable address, the CPU interrupt signal generator 3b, on the basis of the sense signal, generates a signal to interrupt the CPU 5 via the system control circuit 4.

Only when the sensing result of the address sensor 3a is a disable address, the memory access disable signal generator 3c, on the basis of the sense signal, generate a signal to inhibit the memory corresponding to the disable address from being accessed via the system controller 4.

With the circuit configuration of the present invention, as long as a program (here, assumed to be program A) is running in the access enable area set in the first program access enable area setting circuit 1, it is in normal operation. As a result, the program access control circuit 3 generates no control signals, that is, neither an interrupt signal nor an access disable signal, to the CPU 5, and memories 6 to 8 via the system control circuit 4.

When program A has accessed an area other than the access enable area, the sense signal from the address sensor 3a triggers the CPU interrupt signal generator 3b, which then generates an interrupt signal to the CPU 5 via the system controller 4, thereby telling the CPU 5 the invalid accessing of program A.

At the same time, the memory access disable signal generator 3c generates an access disable signal, which is supplied via the system control circuit 4 to the ROM 6, RAM 7, and EEPROM 8, thereby inhibiting these memories from being accessed invalidly.

Such a series of operations of the first program access enable area setting circuit 1 and program access control circuit 3 achieves control of multi-program execution in such a manner that a program is inhibited from unnecessarily accessing another program, which is one of the objects of the invention.

Next, referring to the memory maps in FIGS. 2 and 3, the memory maps and access control between programs in a one-chip microcomputer having a plurality of programs in the multi-program execution controlling apparatus will be explained.

First, in the map of FIG. 2, a memory map for the entire memory consisting of the ROM 6, RAM 7, EEPROM 8, and others is specifically sorted into the memory map 12 for the ROM 6, the memory map 13 for the RAM 7, and the memory map 14 for the EEPROM 8.

As shown in these memory maps 12, 13, and 14, the memory map 12 for the ROM 6 contains a plurality of programs A, B , . . . ; the memory map 14 for the EEPROM 8 contains the expansion and work areas for programs A, B , . . . and the storage and work areas for programs 1, 2 , . . . ; and the memory map 13 for the RAM 7 contains the work areas for programs A, B, . . . and programs 1, 2, . . .

The system reset effected by the CPU 5 starts a program whose operable range is set in each of the registers 1a, 1b, 1c in the first program access enable area setting circuit 1 among the plurality of programs A, B, . . . stored in the ROM 6.

It is assumed that the operable range of program A has been set in each of the registers 1a, 1b, 1c.

To use the data processed by another program (here, assumed to be program B) in executing program A, the CPU 5, according to the instruction from program A, first sets the start address of program A when control returns from program B to program A in the start address register 1b via the address bus 9 and system control circuit 4. The CPU also sets the operable range including the start address of program B in each of the registers 1a, 1b, and 1c in the second program access enable area setting circuit 2.

In such a specification that program A can completely control another program, such as program B, control can jump from program A to a specific address in program B freely. Therefore, the CPU 5 needs not set the start address of program B and has only to disable the start address register 2b in the second program access enable area setting circuit 2 in which the start address of program B is to be set.

After these operations, the CPU 5 orders that control should jump from program A to the allocated start address in program B or a specific address in program B, thereby switching execution from program A to program B.

As long as program B is executed in the range of enable addresses, the address sensor 3a outputs a signal indicating that the program is in normal operation, so that the CPU 5 is not interrupted and the memory access is not inhibited.

When program B has accessed an address space other than the enable addresses invalidly or as a result of runaway, however, the address sensor 3a senses the disable address and outputs a sense signal to the CPU interrupt signal generator 3b and the memory access disable signal generator 3c.

The sense signal causes the CPU interrupt signal generator 3b to generate an interrupt signal and the memory access disable signal generator 3c to generate an access disable signal. The interrupt signal is used to interrupt the CPU 5 via the system control circuit 4. The access disable signal is used to inhibit the memory corresponding to the disable addresses from being accessed.

When control returns from program B to program A, the CPU 5 enables the start address register 1b of the first program access enable area setting circuit 1 in which conditions for program A have been already set and orders a jump from program B to program A so that control may return to the start address of program A.

This makes program A ready to operate.

At this time, when the address of the destination of the jump from program B to program A differs from the setting value in the start address register 1b previously set for program A, the address sensor 3a will sense it and interrupt the CPU 5 via the CPU interrupt signal generator 3b and system control circuit 4.

The above operation holds true for the case where program A uses the data processed in another program C, D, . . . while it is being executed.

Figure 3:
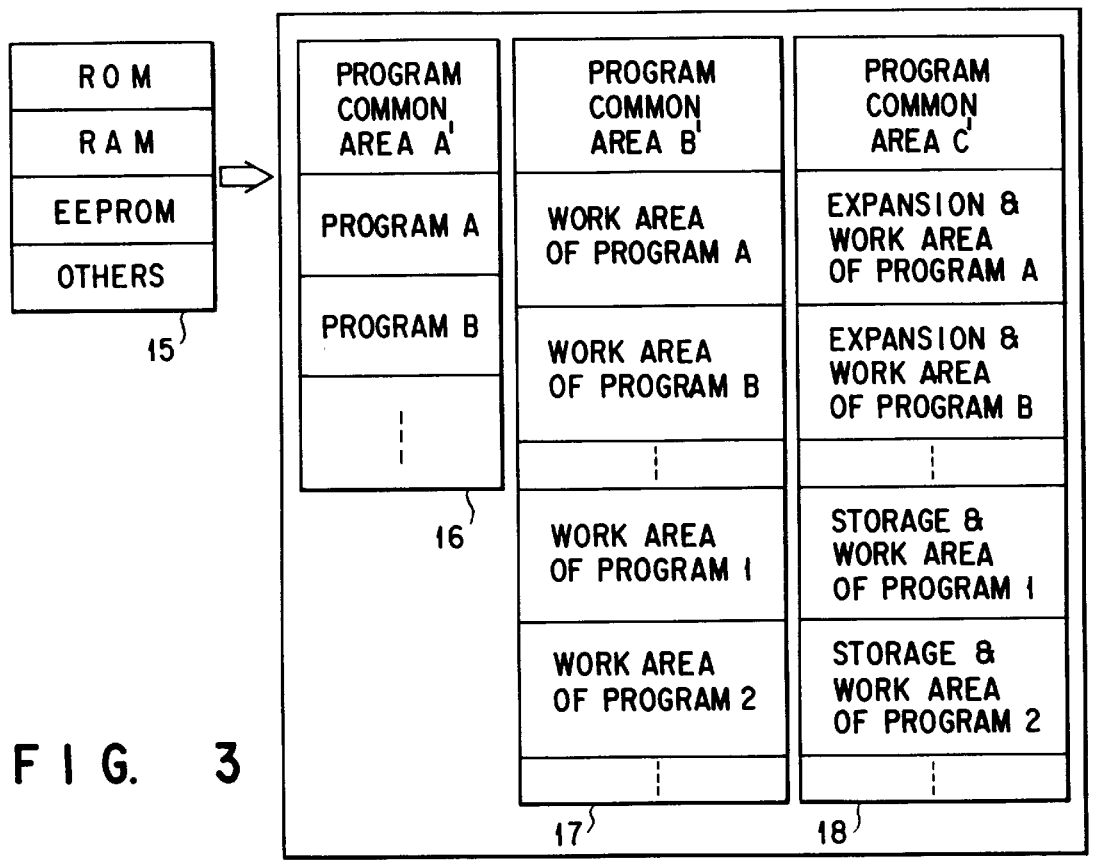
FIG. 3 is a memory map to help explain access to memory in the multi-program execution controlling apparatus of the present invention.

In the map of FIG. 3, a memory map for the memory consisting of the ROM 6, RAM 7, EEPROM 8, and others is specifically sorted into the memory map 16 for the ROM 6, the memory map 17 for the RAM 7, and the memory map 18 for the EEPROM 8.

As shown in these memory maps 16, 17, and 18, the memory map 16 for the ROM 6 contains the storage areas of a plurality of programs A, B, . . . , and program common area A'; the memory map 18 for the EEPROM 8 contains the expansion and work areas for programs A, B, . . . , the storage and work areas for programs 1, 2, . . . , and program common area C'; and the memory map 17 for the RAM 7 contains the work areas for programs A, B, . . . and programs 1, 2, . . . , and program common area B'.

The memory map shown in FIG. 3 differs from the memory map in FIG. 2 in that the individual memories have program common areas A', B', and C', respectively.

The reason for this is that because the respective programs are inhibited from directly accessing each other, when a program currently being executed accesses another program, the switching of execution from one program to another is effected on the program common areas A', B', and C' according to specific program switching rules.

First, after the CPU has reset the system, which of programs A, B, . . . and 1, 2, . . . is to be executed is specified by the program common areas A', B', and C'.

A method of specifying a prioritized execution program may be carried out either on the basis of the externally supplied data or according to internally fixed rules.

For example, it is assumed that after the system reset, program A is selected and the first program access enable area setting circuit 1 is allocated to program A.

Then, when control is needed to switch from program A to another program (here, assumed to be program 1), the CPU 5, according to the instruction from program A, orders that a specific instruction or data items to jump to program 1 should be written in the program common area B' or C'.

In this case, as described above, since the respective programs are inhibited from directly accessing each other, even when program A attempts to access another program 1, the access will be inhibited.

Therefore, the CPU 5 orders that control should move temporarily from program A to program common area B' or C'. At the same time, on the basis of the specific instruction or data written according to the instruction from program A, the CPU sets the operable range of program 1 in the respective registers 2a, 2b, and 2c in the second program access enable setting circuit and thereafter orders that control should jump to program 1.

Next, referring to FIGS. 4 and 5, a further detailed explanation will be given about access control between a bit map and a program in a one-chip microcomputer having a plurality of programs in the multi-program execution controlling apparatus.

Figure 4:
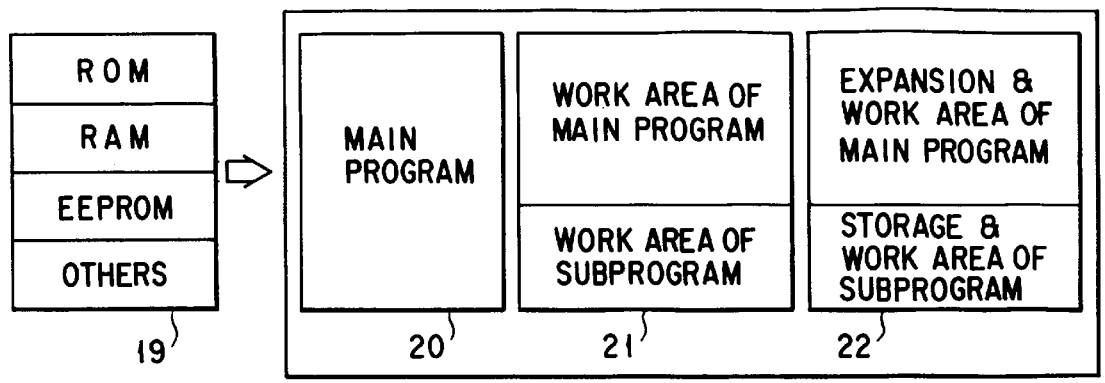
FIG. 4 is a memory map to help explain access to memory in the multi-program execution controlling apparatus of the present invention.

FIG. 4 shows an example of having a main program and a sub-program.

In this example, a memory map for the entire memory consisting of the ROM 6, RAM 7, EEPROM 8, and others is specifically sorted into the memory map 20 for the ROM 6, the memory map 21 for the RAM 7, and the memory map 22 for the EEPROM 8.

As shown in these memory maps 20, 21, and 22, the memory map 20 for the ROM 6 contains a storage area for the main program; the memory map 22 for the EEPROM 8 contains the expansion and work area for the main program and the storage and work area for the sub-program; and the memory map 21 for the RAM 7 contains the work areas for the main program and the sub-program.

First, when the CPU has reset the system, this enables the first program access enable area setting circuit 1 and sets the operable range of the main program in the respective registers 1a, 1b, 1c in the setting circuit.

After the system resetting, the main program starts to run.

While the main program is being executed, control may jump to the sub-program as the need arises and the data processed at the sub-program may be used in the main program.

In that case, the CPU 5, according to the instruction from the main program, first sets the start address of the main program when control returns from the sub-program in the start address register 1b in the first program access enable area setting circuit 1. At the same time, the CPU sets the operable range in the sub-program in the respective registers 2a, 2b, 2c in the second program access enable area setting circuit 2.

Next, the CPU 5 orders that control should jump from the main program to the allocated start address for the sub-program or a specific address in the sub-program.

This switches execution from the main program to the sub-program.

As long as the sub-program is executed in the range of enable addresses, the address sensor 3a outputs a signal indicating that the program is in normal operation, so that the CPU 5 is not interrupted and the memory access is not inhibited.

When the sub-program has accessed an address space other than the enable addresses invalidly or as a result of runaway, however, the address sensor 3a senses the disable address and outputs the sense signal.

The sense signal causes the CPU interrupt signal generator 3b to generate an interrupt signal and the memory access disable signal generator 3c to generate an access disable signal. The interrupt signal is used to interrupt the CPU 5 via the system control circuit 4. The access disable signal is used to inhibit the memory corresponding to the disable addresses from being accessed.

Thereafter, when control returns from the sub-program to the main-program, the CPU 5 enables the first program access enable area setting circuit 1 in which conditions for the main program have been already set and orders a jump from the sub-program to the main program so that control may return to the start address of the main program.

This makes the sub-program ready to operate.

At this time, when the address of the destination of the jump from the sub-program to the main program differs from the setting value in the start address register 1b previously set for the main program, the address sensor 3a will sense it and interrupt the CPU 5 via the CPU interrupt signal generator 3b and system control circuit 4.

Figure 5:
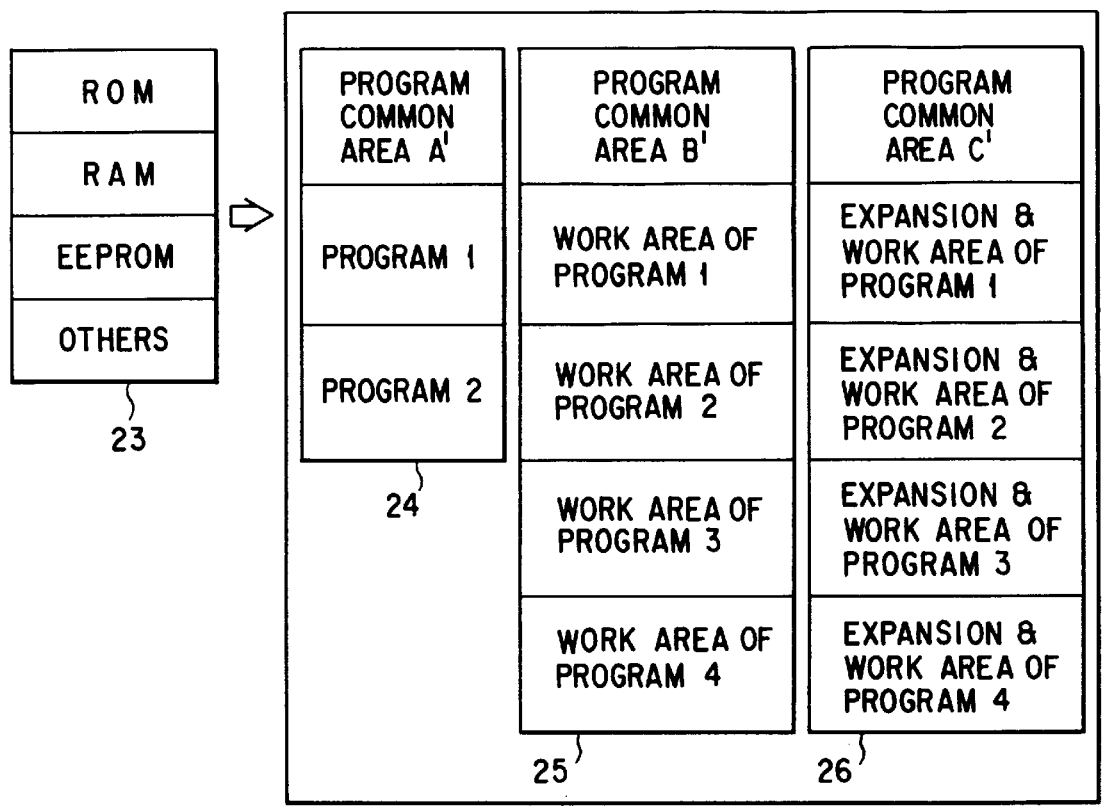
FIG. 5 is a memory map to help explain access to memory in the multi-program execution controlling apparatus of the present invention.

FIG. 5 shows an example of having two programs 1 and 2 in the ROM 6 and two programs 3 and 4 in the EEPROM 8.

In this example, a memory map 23 for the entire memory consisting of the ROM 6, RAM 7, EEPROM 8, and others is specifically sorted into the memory map 24 for the ROM 6, the memory map 25 for the RAM 7, and the memory map 26 for the EEPROM 8.

As shown in these memory maps 24, 25, and 26, the memory map 24 for the ROM 6 contains the storage areas of programs 1 and 2 and program common area A'; the memory map 26 for the EEPROM 8 contains the expansion and work areas for programs 1 and 2, the storage and work areas for programs 3 and 4, and program common area C'; and the memory map 25 for the RAM 7 contains the work areas for programs 1 to 4 and program common area B'.

It is assumed that after the CPU 5 has reset the system, program 1 is selected and the first program access enable area setting circuit 1 is allocated to program 1.

To switch from program 1 to another program (here, assumed to be program 3), the CPU 5, according to the instruction from program 1, orders that a specific instruction or data item to jump to program 3 should be written in the program common area B' or C'.

Since the respective programs are inhibited from directly accessing each other, program 1 is inhibited from accessing the other programs 2 to 4. In this example, even when program 1 attempts to access another program 3, the access will be inhibited.

Therefore, the CPU 5 orders that control should move temporarily from program 1 to program common area B' or C'. At the same time, on the basis of the specific instruction or data written according to the instruction from program 1, the CPU sets the operable range of program 3 in the respective registers 2a, 2b, and 2c in the second program access enable area setting circuit 2 and thereafter orders that control should jump to program 3.

From this time on, the CPU 5 repeats the above-described procedures as the need arises.

As explained above, with the multi-program execution controlling apparatus, from the position to create and manage programs stored in ROMs, it is possible to prevent the sub-program from accessing the main program invalidly in a one-chip microcomputer having a plurality of programs and assure the security of the main program. In addition, because there is no need of making the chip operating system of the one-chip microcomputer known to a programmer to write the sub-program, it is possible to assure the security of the chip operating system.

Furthermore, with the multi-program execution controlling apparatus of the invention, a programmer to write the sub-program has only to write a program containing only the functions necessary for the sub-program even if not knowing the operating system of the one-chip microcomputer, so that the programmer can create the sub-program easily.

Furthermore, with the multi-program execution controlling apparatus of the invention, even if the operation of the sub-program goes wrong, the adverse effect of the sub-program on the main program can be minimized because the sub-program is inhibited from accessing the main program.

Furthermore, with the multi-program execution controlling apparatus of the invention, the facility for creating the sub-program remarkably widens the range of programmers to write the sub-program, which was restricted to the programmers who knew the chip operating system in the prior art. Just knowing the system operation of the CPU, programmers can write the sub-program, making it possible to cope with the needs application by application, shorten the programming time, and provide a variety of applications.

Furthermore, with the multi-program execution controlling apparatus of the invention, from the viewpoint of cost, for example, by storing the sub-program in a rewritable nonvolatile memory, such as an EEPROM, it is unnecessary to create the mask data for a ROM for each application program, which was necessary in the prior art. Instead, the mask data must be made only for a single main program, which reduces the production cost of the mask data for each application, allowing a lower programming cost.

Furthermore, with the multi-program execution controlling apparatus of the invention, the time to create the mask data for the application is unnecessary except for the time required to install the sub-program for the application in a sample containing the existing main program. In addition, because the programs are inhibited from accessing each other, this assures the security of the data in each program. Therefore, for example, in the case of ciphered programs where security is important, it is possible to keep the algorithm of the ciphered program or the method of processing the data secret from the other programmers, preventing not only the invalid accessing of another program but also invalid use or copy of the ciphered program.

Furthermore, with the multi-program execution controlling apparatus of the invention, the afore-mentioned features help enhance the effectiveness of the copyright of the program, thereby protecting the owner's interests.

Furthermore, with the multi-program execution controlling apparatus of the invention, it is possible to create a program valuable as a program application package, such as a ciphered program, which is not restricted by the chip operating system and particularly requires its security.

By putting not only the ciphered program but also a concrete algorithm corresponding to each application in black boxes, their security is increased, preventing the value of the product from decreasing.

Namely, by applying the technique of the invention for inhibiting another program from accessing to putting programs in black boxes, the security of the program can be increased.

For example, by entering by use of an IC card a decode key to decode the ciphered data in satellite broadcasting, the right to access the satellite broadcasting is obtained.

At that time, use of the present invention prevents even the programmer of the main program from knowing the algorithm of the ciphered program, assuring the security of the cipher.

Furthermore, the IC card issuing company can completely entrust a cipher creating company with the care of the ciphering section, which eliminates the danger of leaking the ciphering information within the IC card issuing company.

Furthermore, the separation of the main program programmer from the ciphered program programmer helps enhance the security of the programs between them.

As described in detail, with the present invention, it is possible to provide a multi-program execution controlling apparatus and method which control the execution of programs in a one-chip microcomputer having a plurality of programs in a manner that inhibits a program from unnecessarily accessing another program and increases the security of the programs and data.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A multi-program execution controlling apparatus comprising:

storage means for storing a plurality of programs;

central processing means for controlling execution of each one of said plurality of programs stored in said storage means; and setting means, in cooperation with said central processing means, for setting at least one of a disable area that inhibits accessing of another program and an enable area that allows the accessing of said another program, in said each one of said plurality of programs stored in said storage means, wherein:

said storage means has ROM, RAM and EEPROM, said ROM being provided with storage areas for a first group of said plurality of programs, said EEPROM being provided with expansion and work areas for said first group of said plurality of programs, and with storage and work areas for a second group of said plurality of programs, and said RAM being provided with work areas for each of said first group of said plurality of programs and said second group of said plurality of programs;

said central processing means has a CPU and a system control circuit;

said setting means has a first program access enable area setting circuit, a second program access enable area setting circuit, and a program access control circuit; and said program access control circuit includes an address detection circuit, a CPU interrupt signal generator circuit, and a memory access disable signal generator circuit, and wherein:

among said first group of said plurality of programs stored in said ROM, a first one of said first group of said plurality of programs whose operable range is set by said first program access enable area setting circuit starts to operate when said CPU resets a system;

when data processed in a second one of said first group of said plurality of programs needs to be used during execution of said first one of said first group of said plurality of programs, said CPU, according to an instruction from said first one of said first group of said plurality of programs, sets a start address of said first one of said first group of said plurality of programs to be used when control has returned from said second one of said first group of said plurality of programs to said first one of said first group of said plurality of programs, in said first program access enable area and via said system control circuit, and sets an operable range including a start address of said second one of said first group of said plurality of programs in said second program access enable area setting circuit;

said CPU subsequently switches execution from said first one of said first group of said plurality of programs to said second one of said first group of said plurality of programs by ordering that control jump from said first one of said first group of said plurality of programs to one of a start address to which said second one of said first group of said plurality of programs is allocated and a specific address of said second one of said first group of said plurality of programs;

said CPU is not interrupted and the memory access is not inhibited in cases where said second one of said first group of said plurality of programs is executed in enable addresses and where a signal indicating a normal operation of said second one of said first group of said plurality of programs is output in said address detection circuit, and, in at least one of a case where said second one of said first group of said plurality of programs accesses an address space other than the enable addresses invalidly and a case where, as a result of runaway, said address detection circuit detects the address other than the enable address and outputs a sense signal to said CPU interrupt signal generator circuit and to said memory access disable signal generator circuit so that, via said system control circuit, said CPU is interrupted by an interrupt signal generated in said CPU interrupt signal generator circuit and that an accessing to a memory corresponding to the address other than the enable address is inhibited by an access disable signal generated in said memory access disable signal generator circuit; and when control returns from said second one of said first group of said plurality of programs to said first one of said first group of said plurality of programs, said CPU enables said first program access enable area setting circuit in which conditions for said first one of said first group of said plurality of programs have been already set, and orders a jump from said second one of said first group of said plurality of programs to said first one of said first group of said plurality of programs so that control may return to the start address of said first one of said first group of said plurality of programs.

2. A multi-program execution controlling apparatus comprising:

storage means for storing a plurality of programs;

central processing means for controlling execution of each one of said plurality of programs stored in said storage means; and setting means, in cooperation with said central processing means, for setting at least one of a disable area that inhibits accessing of a first other program and an enable area that allows the accessing of said first other program, in said each one of said plurality of programs stored in said storage means, wherein:

said storage means has ROM, RAM and EEPROM, said ROM being provided with storage areas for a first group of said plurality of programs and a firs program common area, said EEPROM being provided with expansion and work areas for said first group of said plurality of programs, storage and work areas for a second group of said plurality of programs, and a second program common area, and said RAM being provided with work areas for each of said first group of said plurality of programs and said second group of said plurality of programs, and a third program common area;

said central processing means has a CPU and a system control circuit;

said setting means has a first program access enable area setting circuit, a second program access enable area setting circuit, and a program access control circuit; and said program access control circuit includes an address detection circuit, a CPU interrupt signal generator circuit, and a memory access disable signal generator circuit, and wherein:

according to instructions from said first program common area, said second program common area, and said third program common area, a first one of said first group of said plurality of programs is selected and said first program access enable area setting circuit is allocated for said first one of said first group of said plurality of programs after said CPU resets a system;

when said first one of said first group of said plurality of programs needs to be switched to a second other program of said plurality of programs, other than said first one of said first group, and when said CPU orders that one of a specific instruction and a data item to jump to said second other program be written in one of said third program common area and said second program common area according to an instruction from said first one of said first group of said plurality of programs, said CPU orders that control move temporarily from said first one of said first group of said plurality of programs to one of said first program common area and said third program common area, and that control jump to said second other program after an operable range of said second other program is set in said second program access enable area setting circuit on a basis of one of the specific instruction and the data item written according to the instruction from said first one of said first group of said plurality of programs; and each program, which is inhibited from directly accessing each other program, is thereby switched to each other in said first program common area, said third program common area, and said second program common area in accordance with a specific system switching rule in cases where a program is accessed during execution of another program.

3. A multi-program execution controlling apparatus comprising;

storage means for storing a plurality of programs;

central processing means for controlling execution of each one of said plurality of programs stored in said storage means; and setting means, in cooperation with said central processing means, for setting at least one of a disable area that inhibits accessing of another program and an enable area that allows the accessing of said another program, in said each one of said plurality of programs stored in said storage means, wherein:

said storage means has ROM, RAM and EEPROM, said ROM being provided with expansion and storage areas for a main program, said EEPROM being provided with storage and work areas for a sub-program, and said RAM being provided with work areas for each one of the main program and the sub-program;

said central processing means has a CPU and a system control circuit;

said setting means has a first program access enable area setting circuit, a second program access enable area setting circuit, and a program access control circuit; and said program access control circuit includes an address detection circuit, a CPU interrupt signal generator circuit, and a memory access disable signal generator circuit, and wherein:

when said CPU resets a system, an operable range of the main program is set in said first program access enable area setting circuit, thereby operating the main program;

wherein when control jumps to the sub-program and data processed in the sub-program is used in the main program during execution of the main program, said CPU, according to an instruction from the main program, sets a start address of the main program to be used when control has returned from the sub-program to the main program, and sets an operable range of the sub-program in said start address being used;

said CPU switches execution from the main program to the sub-program by ordering that control should jump from the main program to one of a start address to which the sub-program is allocated and a specific address of the sub-program;

said CPU is not interrupted and the memory access is not inhibited in cases where the sub-program is executed in enable addresses and where a signal indicating a normal operation of the sub-program is output in said address detection circuit, and, in at least one of a case where the sub-program accesses an address space other than the enable addresses invalidly and a case where, as a result of runaway, said address detection circuit detects the address other than the enable address and outputs a sense signal to said CPU interrupt signal generator circuit and to said memory access disable signal generator circuit so that, via said system control circuit, said CPU is interrupted by an interrupt signal generated in said CPU interrupt signal generator circuit and so that an accessing to a memory corresponding to the address other than the enable address is inhibited by an access disable signal generated in said memory access disable signal generator circuit; and when control returns from the sub-program to the main program, said CPU enables said first program access enable area setting circuit in which conditions for the main program have been already set, and orders a jump from the sub-program to the main program so that control may return to the start address of the main program.

4. A multi-program execution controlling apparatus comprising:

storage means for storing a plurality of programs;

central processing means for controlling execution of each one of said plurality of programs stored in said storage means; and setting means, in cooperation with said central processing means, for setting at least one of a disable area that inhibits accessing of another program and an enable area that allows the accessing of said another program, in said each one of said plurality of programs stored in said storage means, wherein:

said storage means has ROM, RAM and EEPROM, said ROM being provided with storage areas for a first program of said plurality of programs and a second program of said plurality of programs and a first program common area, said EEPROM being provided with expansion and work areas for said first program and said second program and storage and work areas for a third program of said plurality of programs and a fourth program of said plurality of programs and a second program common area, and said RAM being provided with work areas for each one of said first program, said second program, said third program, and said fourth program and a third program common area;

said central processing means has a CPU and a system control circuit;

said setting means has a first program access enable area setting circuit, a second program access enable area setting circuit, and a program access control circuit; and said program access control circuit includes an address detection circuit, a CPU interrupt signal generator circuit, and, a memory access disable signal generator circuit, and wherein:

after said CPU resets a system, said first program is selected and said first program access enable area setting circuit is allocated for said first program; and wherein when said first program needs to be switched to a second other program of said plurality of programs, other than said first program, each program is inhibited from directly accessing each other program such that said CPU first orders that control temporarily move from said first program to one of said third program common area and said second program common area when ordering that one of a specific instruction and data to jump to said second other program be written in at least one of said third program common area and said second program common area, according to an instruction from said first program, sets an operable range of said second other program in said second program access enable area setting circuit on basis of one of a specific instruction and data written in at least one of said third program common area and said second program common area, and orders that control jump to said second other program.

* * * * *